United States Patent [19]

Yamamoto et al.

[11] 4,030,454
[45] June 21, 1977

[54] ROTARY PISTON ENGINES

[75] Inventors: Kenichi Yamamoto; Yutaka Kirose; Tooru Maeda, all of Hiroshima, Japan

[73] Assignee: Toyo Kogyo Co., Ltd., Hiroshima, Japan

[22] Filed: Dec. 11, 1975

[21] Appl. No.: 639,705

[30] Foreign Application Priority Data

| | | |
|---|---|---|
| Feb. 28, 1975 | Japan | 50-25480 |
| Feb. 28, 1975 | Japan | 50-25481 |
| Apr. 1, 1975 | Japan | 50-40032 |
| Sept. 29, 1975 | Japan | 50-118092 |

[52] U.S. Cl. ............................ 123/8.45; 123/8.13
[51] Int. Cl.² .................................. F02B 53/00
[58] Field of Search ................... 123/8.13, 8.45

[56] References Cited

UNITED STATES PATENTS

| | | | |
|---|---|---|---|
| 3,168,077 | 2/1965 | Froede | 123/8.13 |
| 3,244,153 | 4/1966 | Froede | 123/8.45 |
| 3,412,716 | 11/1968 | Tausch et al. | 123/8.45 |
| 3,780,707 | 12/1973 | Cole | 123/8.13 |
| 3,885,003 | 5/1975 | Kobayashi et al. | 123/8.13 X |
| 3,905,337 | 9/1975 | Shimoji et al. | 123/8.13 X |
| 3,915,126 | 10/1975 | Kishimoto et al. | 123/8.13 |

FOREIGN PATENTS OR APPLICATIONS

| | | | |
|---|---|---|---|
| 2,411,698 | 9/1975 | Germany | 123/8.13 |

*Primary Examiner*—Carlton R. Croyle
*Assistant Examiner*—Michael Koczo, Jr.
*Attorney, Agent, or Firm*—Fleit & Jacobson

[57] ABSTRACT

Rotary piston engines in which the rotor housing is formed with a peripheral intake port of relatively small area and at least one of the side housings is formed with a side intake port, and the side intake port is used only in high load engine operation.

12 Claims, 11 Drawing Figures

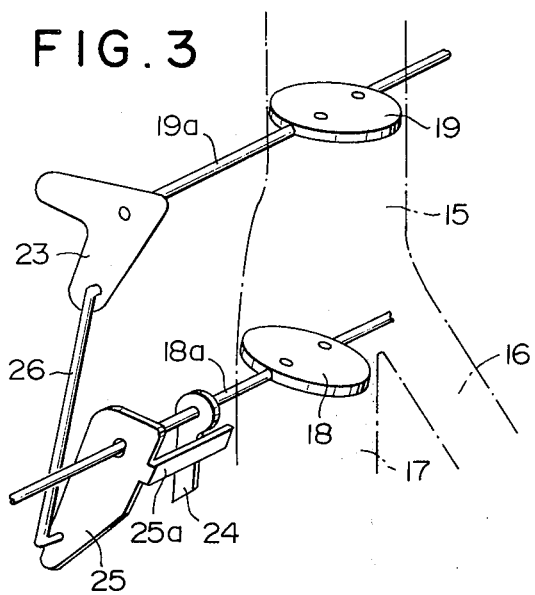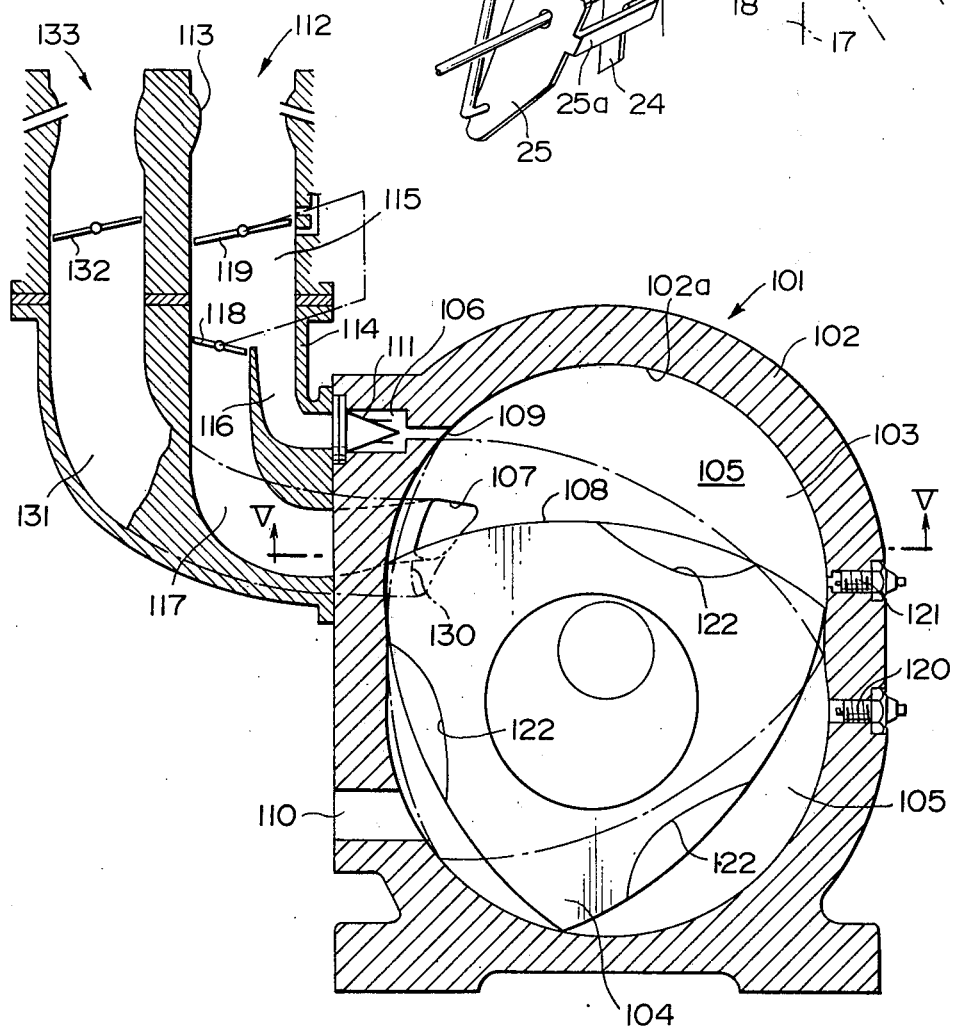

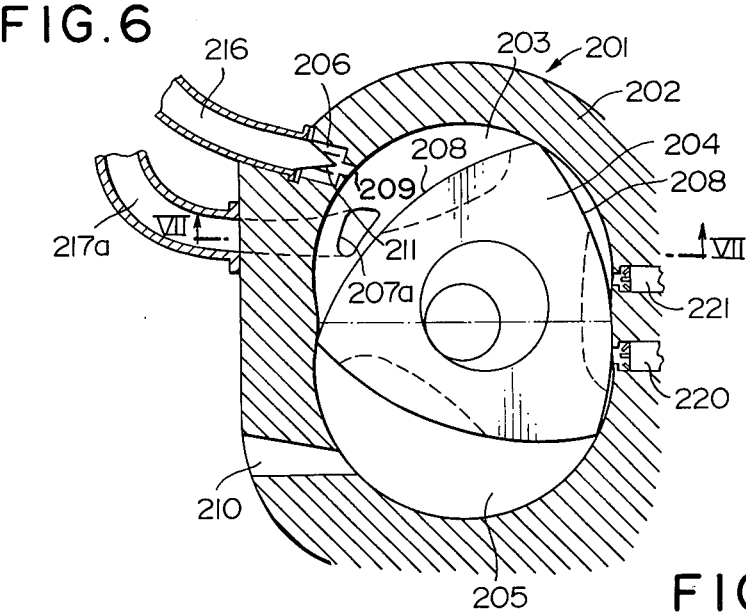
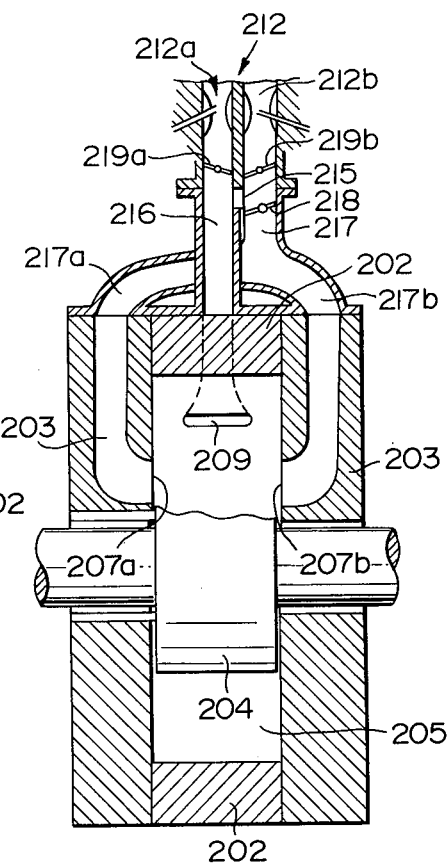
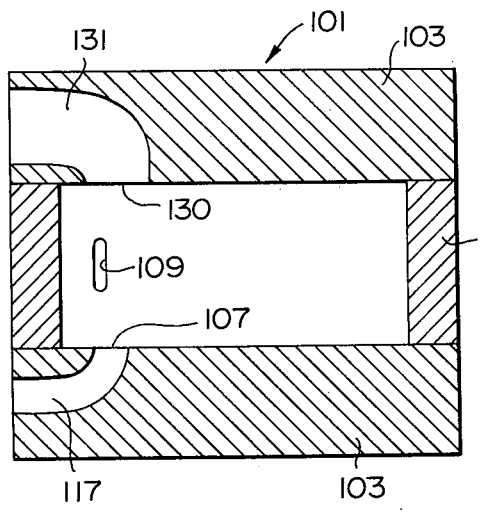

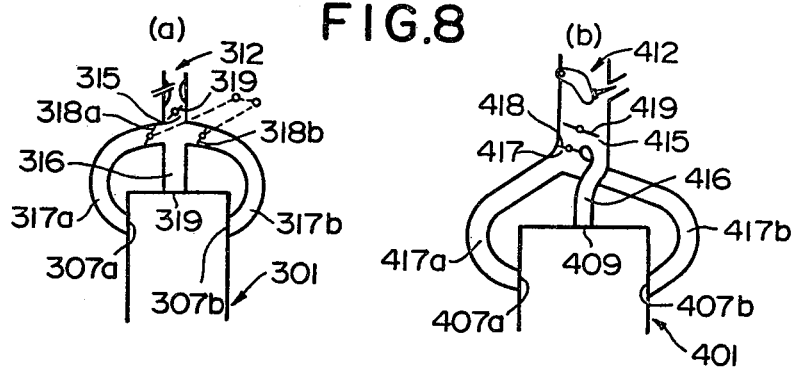
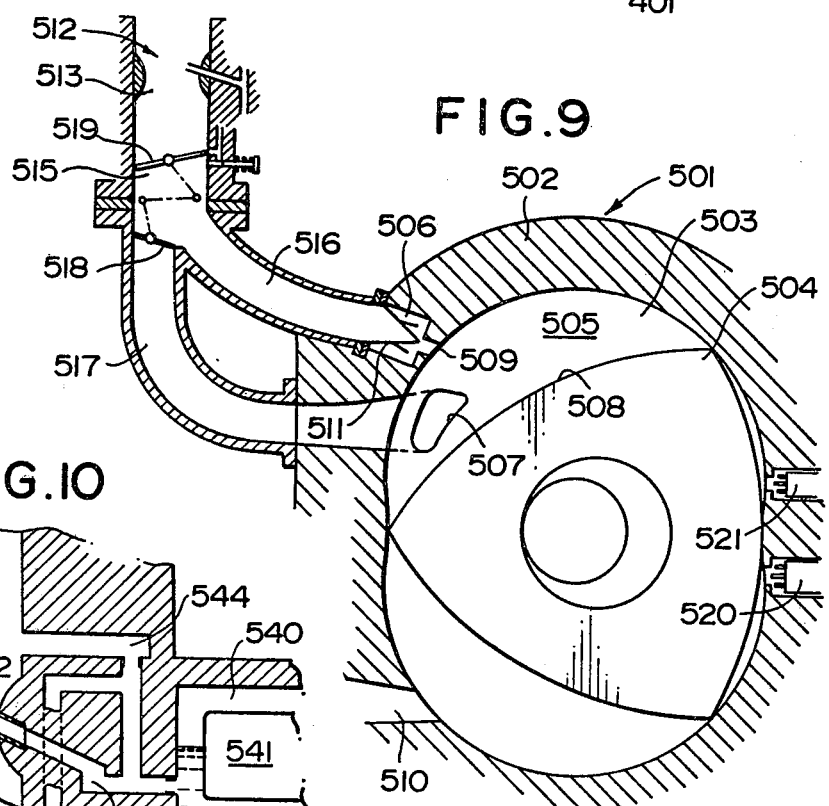
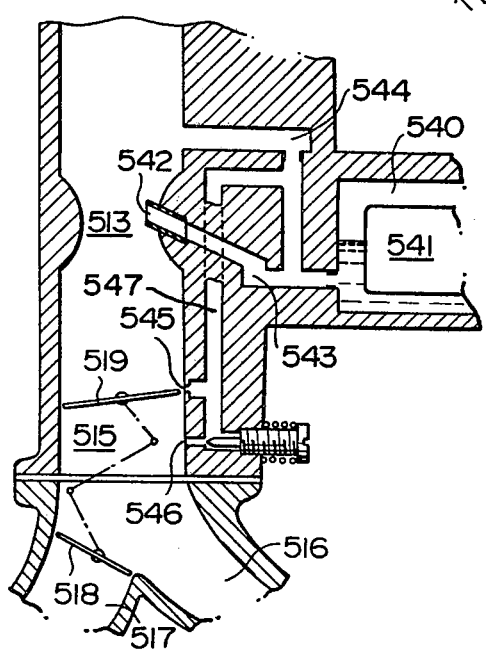

ROTARY PISTON ENGINES

The present invention relates to rotary piston type internal combustion engines and, more particularly to intake means for such engines.

Known type of rotary piston engines comprise a casing which includes a rotor housing having an inner wall of a multi-lobed trochoidal configuration and a pair of side housings secured to the opposite sides of the rotor housing to define therein a cavity of multi-lobed trochoidal configuration, and a substantially polygonal rotor disposed in said cavity for rotation with apex portions in sliding engagement with the inner wall of the rotor housing, so that working chambers of variable volume are defined between the inner wall of the rotor housing and flanks of the polygonal rotor. As the rotor rotates, the position of each working chamber is continuously displaced along the inner wall of the rotor housing with simultaneous and continuous change in volume. Combustible air and fuel mixture is introduced into the working chamber when it is in intake stroke, and compressed and then ignited so that combustion takes place in the chamber.

It has been experienced in this type of engine that the combustion flame propagates due to the swirling in the chamber toward the direction of rotation of the rotor, so that the mixture is not adequately burnt at the trailing side, that is, the area of the working chamber which is in the side opposite to the direction of rotor rotation. This tendency is further enhanced by the fact that the working chambers have tendency of being quenched at the side opposite to the direction of rotor rotation.

In order to overcome the aforementioned problem, it has already been proposed to provide a plurality of intake ports for separately supplying fuel rich mixture and fuel lean mixture in such a manner that the rich mixture is primarily directed to the leading side of the working chamber while the lean mixture is primarily directed to the trailing side whereby a stratified fuel distribution is established in the working chamber. This arrangement has been found effective to make it possible to operate an engine with a relatively lean air-fuel mixture.

This arrangement is, however, disadvantageous in that it requires separate carburetors for independently supplying rich and lean mixtures. Further, one or more of the intake ports must be provided with auxiliary timing control means such as timing valves in order to ensure properly timed supply of such mixtures.

It is therefore an object of the present invention to provide rotary piston engines which can be operated with relatively lean air-fuel mixture.

Another object of the present invention is to provide rotary piston engines in which the aforementioned disadvantages of known arrangement are eliminated.

A further object of the present invention is to provide rotary piston engines in which stratified fuel distribution can be established with relatively simple structures.

According to the present invention, the above and other objects can be accomplished by rotary piston engines which comprise a casing including a rotor housing having an inner wall of a multi-lobed trochoidal configuration and a pair of side housings secured to the opposite sides of the rotor housing to define therein a cavity of multi-lobed trochoidal configuration, and a substantially polygonal rotor disposed in said cavity for rotation with apex portions in sliding engagement with the inner wall of the rotor housing so that working chambers of variable volume are defined between the inner wall of the rotor housing and flanks of the polygonal rotor, first intake port means formed in said rotor housing, second intake port means formed in at least one of said side housings and having an effective area which is larger than that of the first intake port means, intake passage means including main passage means connected with first and second branch passage means which are in turn respectively connected with the first and second intake port means, means for supplying fuel to said intake passage means, and control valve means provided in said second branch passage means and adapted to be opened under a high load operation of the engine.

It has already been proposed to provide intake ports both in the rotor and side housings, whereby use is made of the side intake port formed in the side housing during light load or low speed operation of the engine while the peripheral port formed in the rotor housing is brought into function during high load operation. It has widely been recognized that a peripheral intake port is advantageous in obtaining an increased output because it has only small flow resistance. However, in an arrangement having a peripheral intake port, a disadvantage has been encountered in that there is an appreciable overlap period in which the intake port bridges the working chambers in intake and exhaust strokes. A side intake port is known as being advantageous in respect of the overlap problem, however, it provides an increased flow resistance because mixture flow path must be bent to reach the side intake port. Thus, a side intake port has been considered as being unsuitable for high speed and heavy load engine operations.

The aforementioned proposal is based on the above knowledge of the properties of the peripheral and side intake ports. The arrangement has been found effective in obtaining stable combustion during light load engine operation and an increased engine output under heavy load operation, however, it has been experienced that there are certain limits in an endeavour to attain improved fuel economy and decreased pollutant emissions.

In the aforementioned intake system, although it is possible to eliminate or substantially decrease dilution of mixture which usually experienced due to overlap or bridging of the intake port between the working chambers in intake and exhaust strokes, there is a tendency that relatively rich air-fuel mixture is formed in the intake working chamber at the trailing side, that is, the side opposite to the direction of rotor rotation, while relatively lean mixture is formed at the other side. Therefore, in order to ensure stable combustion during light load engine operation, it has been necessary to supply relatively rich air-fuel mixture. Thus, in this type of engine, relatively large amount of unburnt constituents have been left in the trailing side of the combustion chamber causing problems in respect of fuel economy and pollutant emissions.

Further, in this type of intake system, since the area of the peripheral intake port is relatively large and has a relatively advanced port opening timing, there is a possibility that an appreciable amount of combustion gas is allowed to pass through the port into the intake working chamber during the overlap period in which the port bridges between the intake and exhaust working chambers. In order to avoid this problem, it has been necessary to provide a complicated valve mechanism so that the peripheral intake port is closed at a position very close to the inner wall surface of the rotor housing.

In order to meet the recent requirements on fuel consumption and pollutant emissions, it is very important to decrease the amount of combustion gas introduced into the intake working chamber during the overlap period and to form relatively rich air-fuel mixture in the working chamber at the leading side, that is, the side in the direction or rotor rotation.

The present invention is distinguishable over the known arrangement in that the peripheral intake port is of relatively small area and primarily used in light load operation, while the side intake port is of relatively large area and used in heavy load engine operation. The present invention can eliminate the aforementioned problems of the known intake system.

The above and other object and features of the present invention will become apparent from the following descriptions of preferred embodiments taking reference to the accompanying drawings, in which:

FIG. 3 is a perspective view showing the valve control mechanism employed in the engine shown in FIGS. 1 and 2;

FIG. 4 is a sectional view similar to FIG. 1 but showing another embodiment of the present invention;

FIG. 5 is a sectional view taken substantially along the line V—V in FIG. 4;

FIG. 6 is a sectional view similar to FIG. 1 but showing a further embodiment of the present invention;

FIG. 7 is a sectional view taken substantially along the line VII—VII in FIG. 6;

Figure 1:
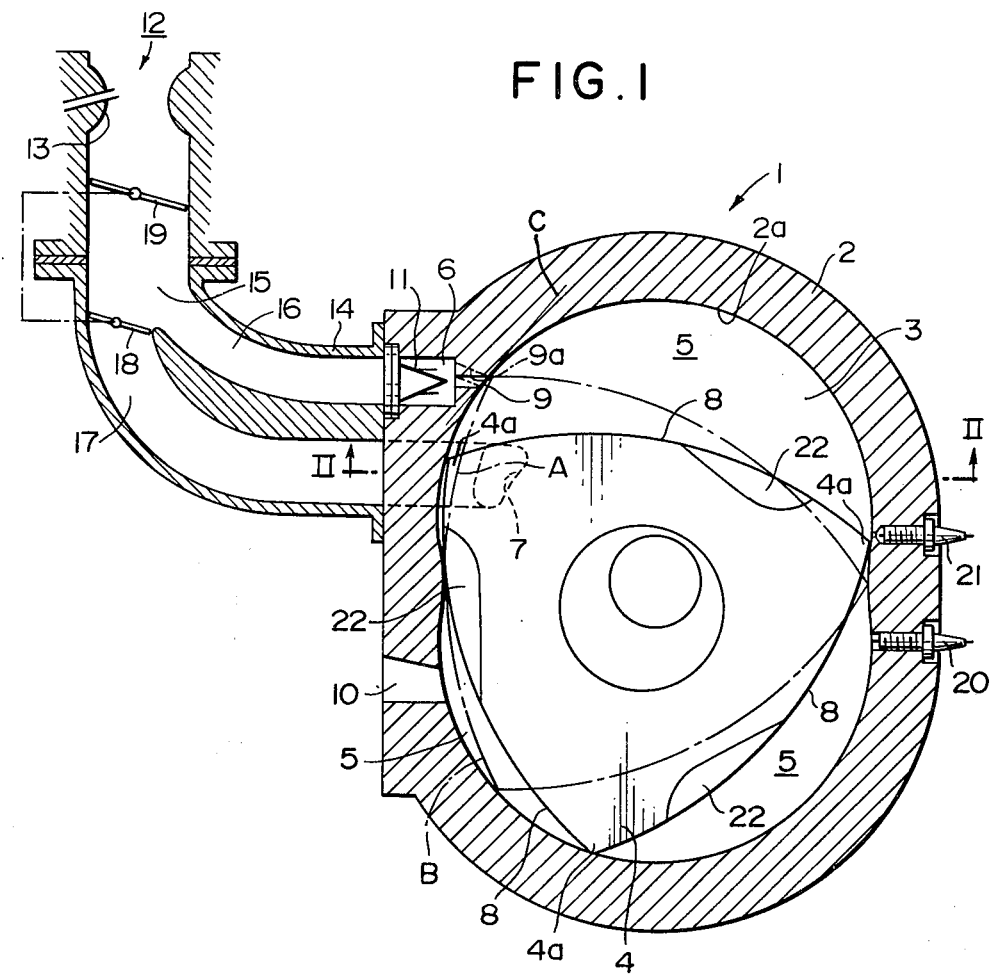
FIG. 1 is a sectional view of a rotary piston type engine in accordance with one embodiment of the present invention.

FIGS. 8(a) and (b) are shcematic diagrams showing alternative arrangements of the intake system;

FIG. 9 is a sectional view similar to FIG. 1 but showing still further embodiment of the present invention; and FIG. 10 is an enlarged sectional veiw showing the details of fuel supply passages.

Figure 2:
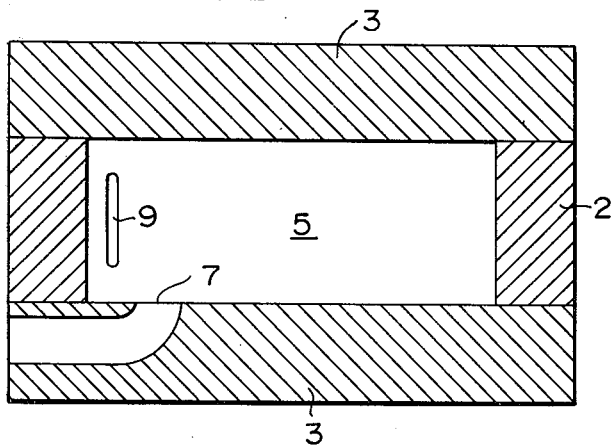
FIG. 2 is a sectional view taken substantially along the line II—II in FIG. 1.

Referring now to the drawings, particularly to FIGS. 1 and 2, the rotary piston engine shown therein includes a casing 1 which comprises a rotor housing 2 having trochoidal inner wall 2a and a pair of side housings 3 secured to the opposite sides of the rotor housing 2. A substantially triangular rotor 4 is disposed in the casing 1 for rotation with apex portions 4a in sliding engagement with the inner wall 2a of the rotor housing 2, whereby three working chambers 5 are defined by flanks 8 of the rotor 4 and the inner wall 2a of the rotor 2. As the rotor 4 rotates, the volume of each working chamber 5 cyclically changes to conduct intake, compression, combustion and expansion, and exhaust strokes of the engine operation.

The rotor housing 2 is formed with an intake chamber 6 which opens through a first intake port 9 to the inner wall 2a of the rotor housing 2. One of the side housings 3 is formed with a second intake port 7.

Further, as in conventional rotary piston type engines, the rotor housing 2 is formed with an exhaust port 10 and also provided with two ignition plugs 20 and 21.

The intake chamber 6 leading to the first intake port 9 is connected through a reed valve 11 and a first branch passage 16 formed in an intake pipe 14 with a main intake passage 15 which comes from a carburetor 12 having a venturi 13. The second intake port 7 is connected through a second branch passage 17 with the main intake passage 15. The second branch passage 17 is provided with a control valve 18 and the main intake passage 15 is provided with a throttle valve 19. The rotor 4 is formed in each of the flanks 8 with a recess 22 at the leading side thereof.

The control valve 18 is interconnected with the throttle valve 19 in such a manner that it is closed in light load operation range in which adequate air can be supplied only through the first intake port 9, but opened in heavy load operating range. FIG. 3 shows an example of such a valve control mechanism.

In FIG. 3, the throttle valve 19 has a throttle valve actuating shaft 19a which is provided at one end with an arm 23. The valve 18 also has an actuating shaft 18a which carries a lever 24 secured thereto. On the valve actuating shaft 18a, there is freely rotatably mounted a lever 25 which has an arm 25a extending toward the lever 24. The lever 25 is connected through a rod 26 with the arm 23 so that the former is rotated simultaneously with the latter. In the closed position of the valves 18 and 19, the arm 25a is spaced from the lever 24 by a predetermined distance whereby, until the throttle valve 19 is opened by a prdetermined amount, the valve 18 is retained in the closed position and, as the throttle valve 19 is opened beyond the predetermined amount, the arm 25a engages the lever 24 to open the control valve 18. It should of course be noted that the control valve 18 may be actuated by suitable intake pressure responsive means in accordance with the intake pressure.

The first intake port 9 thus primarily functions during light load operation and has an effective area which is small in relation to that of the second intake port 7 so that adequate flow speed of intake mixture can be maintained even in idling and other light load engine operation.

Further, the first intake port 9 is located at a position which is advanced in the direction of rotor rotation with respect to the position of the trailing side apex portion 4a of the rotor 4 in the intake bottom dead center wherein the intake working chamber possesses the maximum volume. The first intake port 9 is further located adjacent to the position of the leading side apex portion 4a of the rotor 4 in the intake top dead center wherein the intake working chamber possesses the minimum volume as shown by a phantom line A in FIG. 1.

When the position of the first intake port 9 is shifted beyond the above specified range toward the trailing side, that is, in the direction opposite to the direction of rotor rotation, the intake port may be opened when the pressure in the intake working chamber is still higher than that in the intake passage during light load engine operation. Thus, appreciable amount of gas may be allowed to flow through the first intake port into the intake passage before the combustible air-fuel mixture is taken from the intake passage into the intake working chamber. The combustion gas thus admitted into the intake passage is then introduced again into the intake working chamber during the initial stage of the intake stroke. Therefore, appreciable amount of combustion gas may be entrapped in the intake combustion chamber, particularly at the leading side thereof. When the position of the first intake port 9 is shifted beyond the aforementioned range toward the direction of rotor rotation, a complicated intake passage structure will be required.

In a preferable arrangement, the first intake port 9 is so formed that the flow of intake mixture is directed substantially parallel with the minor axis of the trochoidal configuration of the inner wall 2a. In this arrangement, it is possible to direct the flow of intake mixture toward the leading side of the intake combustion chamber and to prevent the mixture flow from being distorted by the flank 8 of the rotor 4. In this parallel arrangement of the first intake port 9, however, the actual or peripheral width of the port will be increased as the port is shifted toward the direction of rotor rotation resulting in an increase in the overlap period so that, in an arrangement wherein the first intake port is shifted toward the direction of rotor rotation, it may be preferable to direct the port inwardly as shown by phantom lines 9a in FIG. 1. Thus, the preferable direction of the first intake port 9 is dependent on the location of the port so that the first intake port 9 should be designed in such a way that the intake mixture flow would be directed toward the leading side of the intake working chamber 5 taking further the peripheral width into consideration.

As seen in FIG. 2, the first intake port 9 is of an elongated configuration extending in the axial direction of the rotor housing 2. This port configuration is preferable in that the overlap period can be minimized retaining an adequate port area for supplying required amount of air in light load engine operation. In an alternative arrangement, the first intake port may be constituted in the form of small apertures arranged in one or more of axially extending rows.

The reed valve 11 provided in the intake chamber 6 serves to allow flow of combustible mixture toward the working chamber but blocks the flow in the opposite direction. The reed valve 11 further facilitates atomization of fuel in the intake mixture by high frequency vibration of valve members therein.

The second intake port 7 is aimed to supply mixture in high load range of engine operation. In order to meet the requirement, the port 7 has an effective area which is larger than that of the first intake port 9. Further, the second intake port 7 is so located that is opened after the first intake port 9 is opened and closed before the first port 9 is closed so that the blow-back of intake air can be prevented.

In operation, as far as the opening of the throttle valve 19 is below a predetermined value, the control valve 18 is closed to block the flow through the second intake passage 17. In this condition, as soon as the leading side apex portion of the rotor 4 has passed through the first intake port 9, the combustible mixture from the carburetor 12 is allowed to flow into the intake working chamber 5 and directed toward the leading side of the chamber simultaneously displacing the residual combustion gas in the chamber toward the trailing side thereof.

The combustible mixture thus introduced into the leading side of the intake working chamber is then compressed as the rotor 4 rotates and ignited by the ignition plugs 20 and 21 at about compression top dead center.

As the throttle valve 19 is opened beyond the predetermined value, the control valve 18 is also opened so that the mixture from the carburetor 12 is then allowed to flow through the second passage 17 as well as through the first passage 16. In this situation, since the first intake port 9 is opened earlier than the second intake port 7, the combustible mixture is at first introduced in the initial stage of the intake stroke through the first intake port 9 into the leading part of the working chamber 5. Then, the second intake port 7 is opened and combustible mixture is allowed to flow through the ports 7 and 9 into the intake working chamber. Even in this stage of operation, the mixture is continously directed from the first intake port 9 toward the leading part of the intake working chamber. Thus, it is possible to obtain preferable fuel distribution for maintaining stable combustion.

The arrangement of the valve actuating mechanism is such that, under a situation wherein the throttle valve 19 is opened beyond the predetermined value, the opening of the control valve 18 is determined in accordance with the opening of the throttle valve 19 whereby the first passage 16 always functions to supply mixture through the first intake port 9 throughout the whole range of engine operation and the second passage 17 functions to supply only additional mixture which is required to meet the demand for additional engine output.

In the intake system shown in FIGS. 1 through 3, the carburetor 12 is of a single barrel type. However, it should be noted that the carburetor may include a plurality of barrels. Further, the system may include fuel injection type fuel supply means, whereby fuel is injected to the main intake passage.

Referring now to FIGS. 4 and 5, there is shown another embodiment of the present invention. In this embodiment, the construction of the engine is basically the same as that of the embodiment shown in FIGS. 1 through 3 so that it will not be described in detail but corresponding parts are shown by the same reference numerals as in FIGS. 1 through 3 with addition of number 100.

In this embodiment, one of the side housings 103 is formed with a second intake port 107 which is connected through a second branch passage 117 and a control valve 118 with a intake passage 115 as in the previous embodiment. The control valve 118 is started to open when the throttle valve 119 is opened beyond a first predetermined value so that the second passage 117 functions to supply mixture into the working chamber 105 in medium and heavy load engine operations. For the purpose, the port 107 has an effective area which is larger than that of the first intake port 109 but not so large as the second port 7 in the previous embodiment. Further, the second intake passage 117 is so formed that the mixture flow through the second intake port 107 is directed toward the direction of rotor rotation in the intake working chamber 105. With this arrangement, it becomes possible to maintain sufficient flow speed of intake mixture through the second intake port 107 and establish preferable fuel distribution in the working chamber so as to attain stable combustion under medium and heavy load condition.

The other of the side housings 103 is further formed with a third intake port 130 which has a larger area than the second intake port 107 and connected with a third intake passage 131 provided with a control valve 132 and a carburetor 133. The control valve 132 is interconnected with the throttle valve 119 in such a manner that, when the throttle valve 119 is opened beyond a second predetermined value which is greater than the first predetermined value, the control valve 132 is started to open, the opening of the control valve 132 being increased in accordance with increase in the opening of the throttle valve 119.

Thus, in the embodiment shown in FIGS. 4 and 5, combustible mixture is fed, during light load engine operation, only through the first intake port 109 and directed to the leading part of the intake working chamber 105 as in the previous embodiment. As the throttle valve 119 is opened beyond the first predetermined value, the first control valve 118 starts to open so as to provide additional supply of air-fuel mixture for medium and high load engine operation. As the throttle valve 119 is further opened beyond the second predetermined value, the second control valve 132 starts to open so that further additional supply of air-fuel mixture is provided for heavy load and full load engine operation. Although the third intake port 130 is of a large effective area, no adverse effect will be experienced during the light and medium load engine operation due to overlapping of the port between the intake and exhaust working chambers, since the port 130 is provided in the side housing 103.

FIGS. 6 and 7 show a further embodiment of the present invention. In the drawings, corresponding parts are designated by the same reference numerals as in FIGS. 1 through 3 with addition of number 200.

In this embodiment, both of the side housings 203 are formed with second intake ports 207a and 207b, respectively, which correspond to the second intake port 7 in the embodiment of FIGS. 1 through 3. The first intake chamber 206 having the first intake port 209 formed in the rotor housing 202 is connected with the first intake passage 216 which is in turn connected with an intake manifold 215 provided with a two stage carburetor 212 including a first stage 212a having a first throttle valve 219a and a second stage 212b having a second throttle vavle 219b. The second intake ports 207a and 207b are connected respectively through branch passages 217a and 217b with a second intake passage 217 which leads to the manifold 215. In the second intake passage 217, there is provided a control valve 218 which is interconnected with the throttle valve 219a in such a manner that it starts to open when the throttle valve 219a is opened beyond a predetermined value. As in the previous embodiments, the opening of the control valve 218 increases as the opening of the throttle valve increases.

During the light load engine operation, wherein the opening of the throttle valve is below the predetermined value, air-fuel mixture is therefore introduced only through the first intake port 209 and directed toward the leading part of the intake combustion chamber 205. In medium load and heavy load operations wherein the opening of the throttle valve 219a is greater than the predetermined value, the control valve 218 is opened and air-fuel mixture is additionally introduced from the first intake passage 216 through the intake manifold 215 and the second intake ports 207a and 207b into the working chamber 205. In this embodiment, since the additional mixture is supplied from both sides of the working chamber, the mixture from the first intake port 209 is guided by the mixture streams from the ports 207a and 207b along the axial center portion of the working chamber 205. This arrangement provides particular advantage when exhaust gas recirculation is made in order to suppress production of $NO_x$. When such exhaust gas recirculation system is employed in the engine shown in FIGS. 6 and 7, combustion gas may be introduced into the second passage 217 or the branch passages 217a and 217b. Then, mixtures including certain amount of combustion gas are mainly distributed at portions adjacent to the side housings 203 but the mixture from the first intake port 209 is mainly distributed in the axial center portion of the working chamber. Therefore, around the ignition plugs 220 and 221, there is formed an atmosphere of air-fuel mixture which is substantially free of combustion gas whereby stable ignition and combustion of the mixture can be assued.

The second throttle valve 219b may be operated in a manner similar to the operation of a secondary throttle valve in a conventional two-stage carburetor. For example, it may be opened under a heavy load operation to provide an additional supply of air-fuel mixture which may be required for providing additional power output.

A modification of the aforementioned embodiment is shown in FIG. 8(a) in which corresponding parts are shown by the same reference numerals as in FIGS. 1 through 3 with addition of number 300. This arrangement is different from the previous embodiment in that the passages 316, 317a and 317b respectively leading to the ports 309, 307a and 307b are connected with a main passage 315 which has a single barrel carburetor 312 and a throttle valve 319. Further, the passage 317a and 317b are provided with control valves 318a and 318b which are interconnected with the throttle valve 319 as in the previous embodiments.

FIG. 8(b) shows another modification of the previous embodiment with reference numerals the same as those in FIGS. 1 through 3 with addition of number 400. In this arrangement, the passages 417a and 417b from the second intake ports 407a and 407b are connected with a second intake passage 417 having a control valve 418 provided therein. The first intake passage 416 leading from the first intake port 409 and the second intake passage 417 are connected with a main intake passage 415 which has a throttle valve 419 and a variable venturi type carburetor 412.

In FIGS. 9 and 10, there is shown a further embodiment of the present invention, which is substantially identical in arrangement with the engine shown in FIGS. 1 through 3. Therefore, in these Figures, corresponding parts are shown by the same reference numerals as in FIGS. 9 and 10 with addition of number 500, and detailed descriptions of the structures will not be made.

In this embodiment, the carburetor 512 includes a float chamber 540 having a float 541 disposed in the chamber 540 in a conventional manner. A main fuel nozzle 542 is opened to the main venturi 513 and connected through a fuel passage 543 with the float chamber 540. A bleed air passage 544 is appropriately connected with the fuel passage 543. A slow port 545 and an idle port 546 are formed in the main intake passage 515 in the vicinity of the throttle valve 519 and connected through a passage 547 with the float chamber 540. In this embodiment, the slow and idle ports 545 and 546 are formed in the wall of the main intake passage 515 at the side leading to the passage 516 which is connected with the first intake port 509. This arrangement is advantageous in that in idling or light load engine operation, flow of fuel from the ports 545 and 546 is directed into the passage 516 and discharged through the relatively small first intake port 509 into the working chamber 505 with relatively fast intake air flow. Thus, atomization of fuel is facilitated and fuel from the ports 545 and 546 can effectively be introduced into the working chamber.

The invention has thus been shown and described with reference to specific embodiments, however, it should be noted that the invention is in no way limited to the details of the illustrated structures but changes and modifications may be made without departing from the scope of the appended claims.

We claim:

1. Rotary piston engines which comprise a casting including a rotor housing having an inner wall of a multi-lobed trochoidal configuration and a pair of side housings secured to the opposite sides of the rotor housing to define therein a cavity of multi-lobed trochoidal configuration, and a substantially polygonal rotor disposed in said cavity for rotation with apex portions in sliding engagement with the inner wall of the rotor housing so that working chambers of variable volume are defined between the inner wall of the rotor housing and flanks of the polygonal rotor, first intake port means formed in said rotor housing, second intake port means formed in at least one of said side housings and having an effective area which is larger than that of the first intake port means, intake passage means including main passage means, first branch passage means connected at one end to said main passage means and at the other end to said first intake port means, and second branch passage means connected at one end to said main passage means and at the other end to said second intake port means, fuel supply means for supplying fuel to said main passage means, throttle valve means disposed in said main passage means, control valve means disposed in said second branch passage means, control means for closing said control valve means when the opening of said throttle valve means is below a first predetermined value and opening it when said opening of the throttle valve means is above said first predetermined value so that fuel is supplied to said working chamber only through said first intake port means when the opening of said throttle valve means is below said first predetermined value.

2. Rotary piston engines in accordance with claim 1, which further comprise reed type check valve means disposed in said first intake passage means for allowing mixture flow only toward the working chamber.

3. Rotary piston engines in accordance with claim 2, in which said reed type check valve means is located in the vicinity of the first intake port means.

4. Rotary piston engines in accordance with claim 1 in which said second intake port means formed in the side housing is so located that it is opened, during intake stroke, later than the first intake port means and closed earlier than the first intake port means.

5. Rotary piston engines in accordance with claim 1 in which said second intake port means includes two intake ports formed one in each of the side housings.

6. Rotary piston engines in accordance with claim 5 in which said two intake ports of the second intake port means are so located that they are opened and closed substantially simultaneously.

7. Rotary piston engines in accordance with claim 1 in which said second intake port means includes an intake port formed in one of the side housings, the other of the side housings being formed with a third intake port which is of larger area than the second intake port and connected with third intake passage means for supplying air-fuel mixture to the third intake port means.

8. Rotary piston engines in accordance with claim 7 in which said third intake passage means is provided with separate fuel supply means.

9. Rotary piston engines in accordance with claim 7 in which said third intake passage means is provided with further control valve means, and means being provided for opening the further control valve means under a load condition which is heavier than that under which the first mentioned control valve means is opened.

10. Rotary piston engines in accordance with claim 7 in which the control vavle means in the second branch passage means is interconnected with said throttle valve means in the intake passage means in such a way that the control valve means starts to open when the throttle valve means is opened to the first predetermined value, said third intake passage means being provided with further control valve means which is interconnected with said throttle valve means in such a way that it is started to open when the throttle valve means is opened to the second predetermined value which is larger than the first predetermine value.

11. Rotary piston engines in accordance with claim 1 in which said control valve means is interconnected with said throttle valve means in the intake passage means in such a way that the control valve means starts to open when the throttle valve means is opened to the first predetermined value.

12. Rotary piston engines in accordance with claim 1 wherein said fuel supply means includes low speed fuel port means for supplying fuel in idling and low speed engine operation, said low speed fuel port means opening to said main passage means at a side which merges with the first branch passage means.

* * * * *